March 28, 1939.　　E. A. ROCKWELL　　2,152,091
SYSTEM FOR FEEDING FUEL
Original Filed March 3, 1930　　4 Sheets-Sheet 1

INVENTOR
*Edward A. Rockwell*
BY
*Arthur Wright*
ATTORNEY

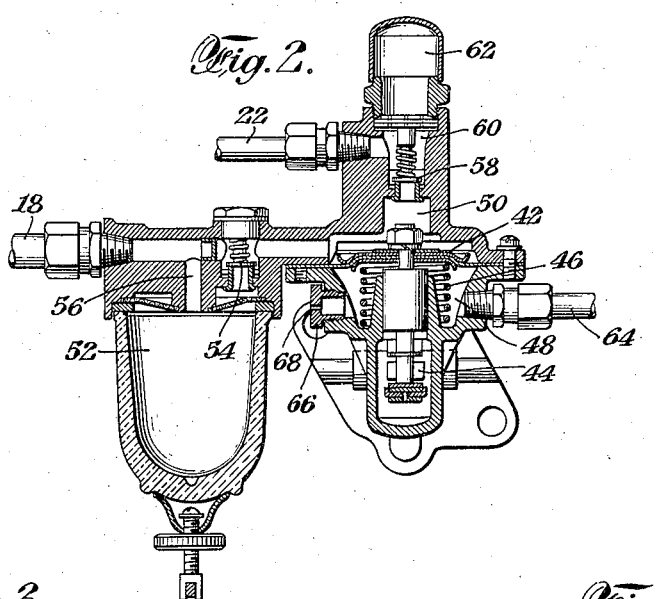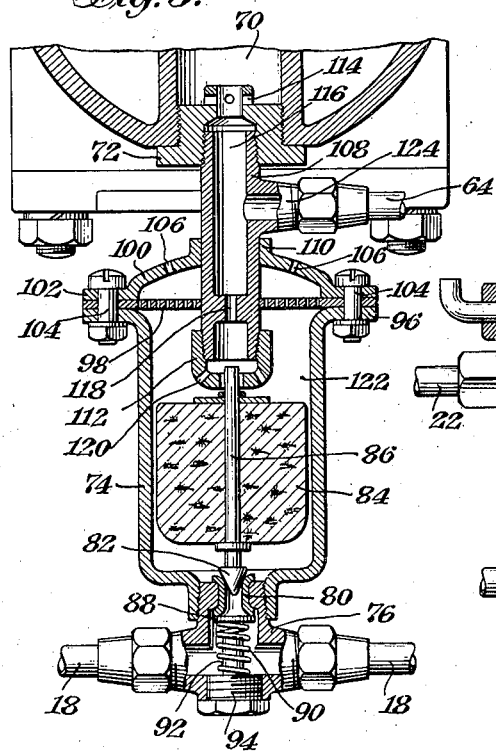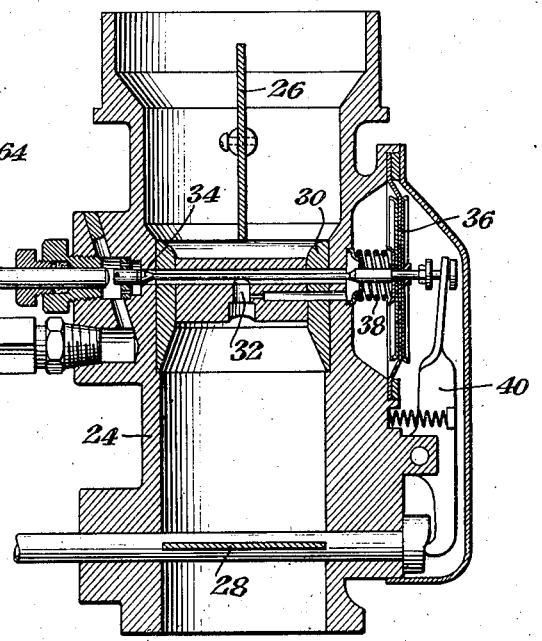

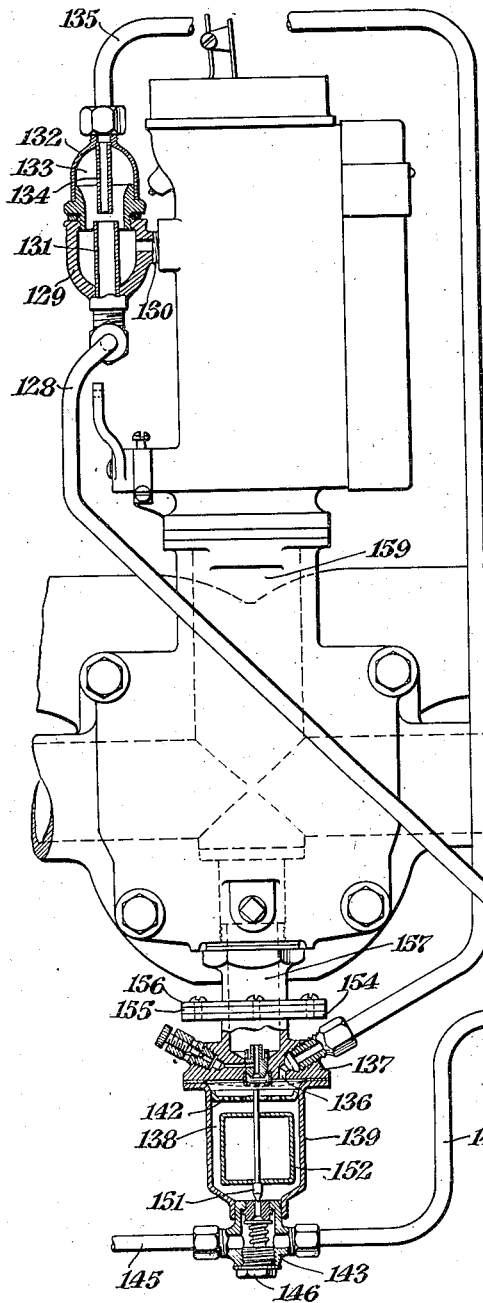

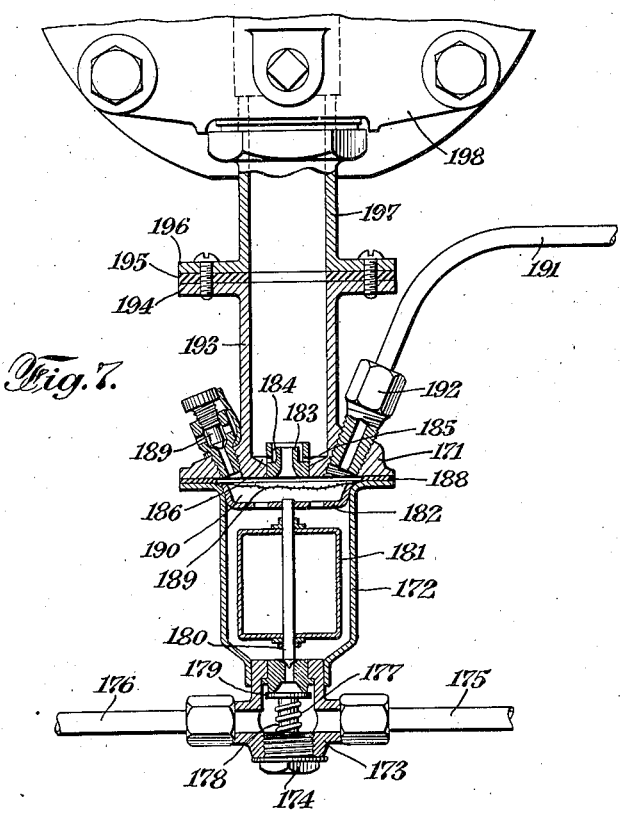
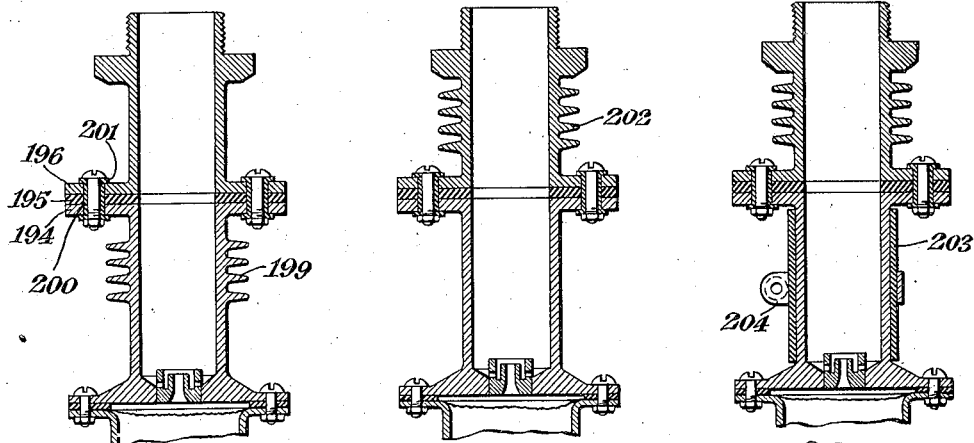

Patented Mar. 28, 1939

2,152,091

UNITED STATES PATENT OFFICE 2,152,091

SYSTEM FOR FEEDING FUEL

Edward A. Rockwell, West Hartford, Conn.

Original applications March 3, 1930, Serial No. 432,743, renewed June 2, 1933, and October 16, 1933, Serial No. 693,742. Divided and this application January 17, 1936, Serial No. 59,628

12 Claims. (Cl. 123—136)

This invention relates to improvements in fuel feeding systems for internal combustion engines and more particularly to systems in which troubles due to accumulation of liquid fuel in the intake manifold are avoided and the fuel economy is maintained by preventing wastage of the excess liquid fuel which is delivered by the carbureter to the intake manifold.

This application is a divisional application of the applicant's application upon Fuel feeding system, Ser. No. 432,743, the renewal of which was filed June 2, 1933 and the original application filed March 3, 1930, now patent Number 2,031,282, also of the application upon Carbureter, Ser. No. 693,742, filed October 16, 1933.

It is well recognized that in general more power may be secured with down-draft carburetion than with up-draft carburetion but the use of down-draft carburetors in connection with internal combustion engines has disclosed certain difficulties in operation. If the venturi or throat of the down-draft carbureter is proportioned for maximum power at high speeds, there is so little vacuum in the venturi at low speeds when the engine is started with wide open throttle that a greater quantity of fuel must be fed than is actually utilized to give the desired mixture and, therefore, the excess liquid fuel accumulates in the lower part of the intake manifold and it has been customary to utilize a drip tube to spill out such excess liquid fuel. It is sometimes impossible to start the engine with a partially closed throttle since sufficient air is not taken in to form the fuel mixture to start the engine and flooding of the manifold takes place, as the high vacuum prevents draining through the drip tube. Furthermore, flooding of the intake manifold may occur if the vehicle is traveling at open throttle with a heavy load. It is highly desirable that some means be employed for preventing the wastage of the excess fuel which accumulates in the intake manifold. Because of the fuel wasted it has not been possible to use down-draft carbureters proportioned to give maximum power since, as the area at the throat of the carbureter is increased, more fuel is wasted on starting and while the engine is under load.

It is a purpose of the present invention to provide a system in which the excess liquid fuel accumulated in the intake manifold is not wasted but is returned to the carbureter and preferably the return is accomplished by sucking the excess liquid fuel into the intake side of the pump which serves to deliver fuel from the supply tank to the carbureter.

It is further an object of the present invention to trap the excess liquid fuel into a float-controlled atmospheric chamber in which a float operates upon a rise of the liquid level to open an outlet valve and a second suction-operated valve is provided which normally prevents the flow of fuel from the supply tank into the float trap chamber should the vehicle be in such position that the supply tank produces a head of fuel on the outlet from the trap chamber. The suction valve is operated by the suction of the pump to permit the fuel to be drawn out of the trap chamber and delivered to the intake side of the pump.

It is further a purpose of the present invention to combine a system for preventing wastage of the excess liquid fuel with a system such as disclosed in my original applications whereby the opening through which the excess liquid fuel is passed from the intake manifold into the trap chamber also serves as the restricted vent for bleeding air into the pressure tube which connects the intake manifold to the back side of the pump diaphragm.

Further and additional objects will be more readily apparent from the full description given in connection with the attached drawings in which a preferred embodiment of the invention is illustrated.

In the drawings—

Fig. 2 is a vertical section taken through the pump which serves to deliver fuel from the supply tank to the carbureter;

Fig. 3 is a vertical section taken through the float-controlled trap chamber and illustrating the manner in which the excess liquid fuel is delivered from the intake manifold to the trap chamber and from the trap chamber into the pipe line which leads to the intake of the pump;

Fig. 4 is a vertical section taken through the venturi throat of the down-draft carbureter and illustrating the arrangement of the choke and throttle valves;

Fig. 5 is an assembly view showing a modified form of fuel trap;

Fig. 6 is a vertical section of the modified form of fuel trap;

Fig. 7 is a vertical section of a modification thereof; and

Figs. 8, 9 and 10 are vertical sections of different forms of construction showing cooling means located on the vapor inlet of the fuel trap.

Figure 1:
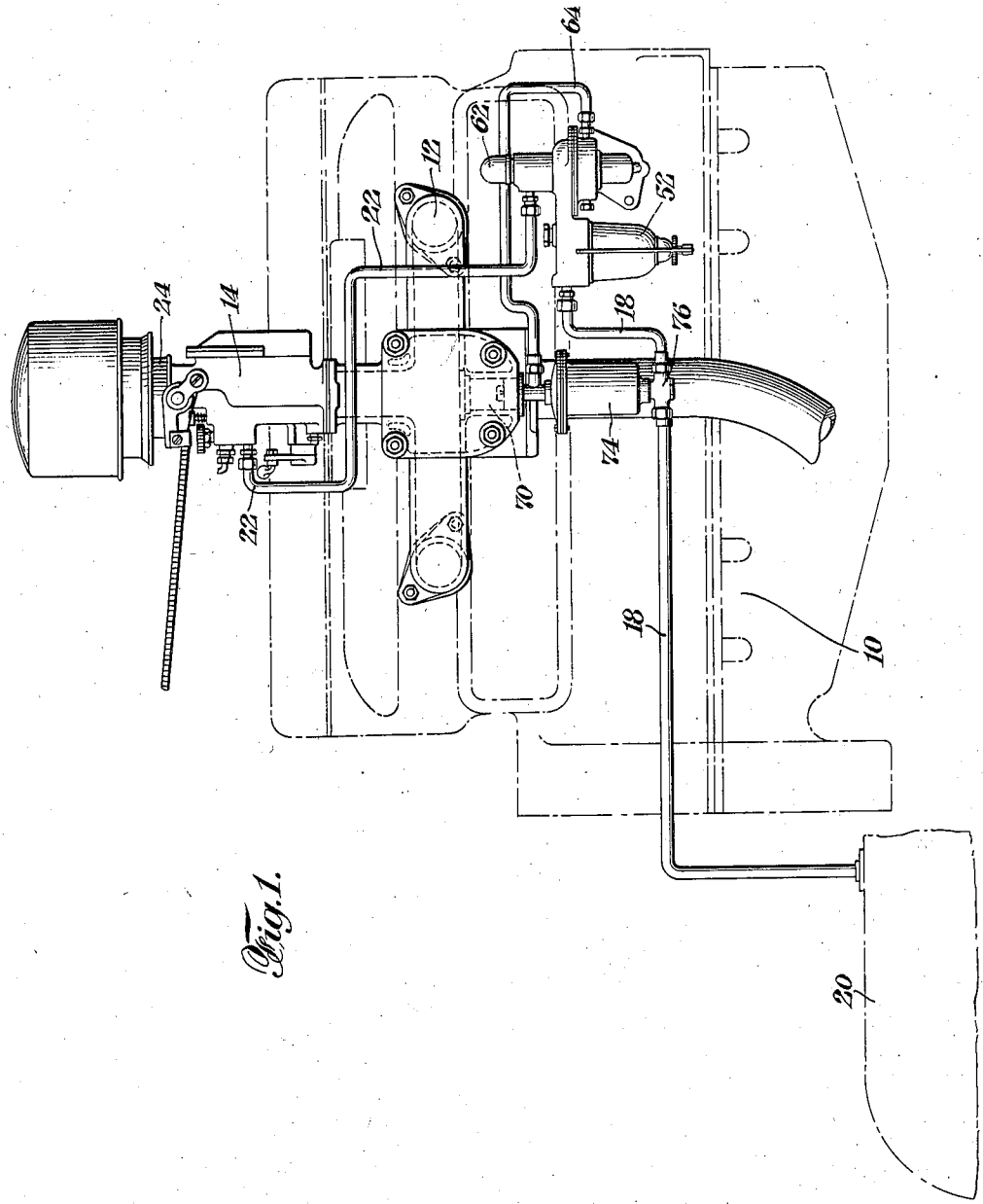
Fig. 1 is a substantially diagrammatic illustration of an internal combustion engine having the present improvements applied thereto.

In the drawings an internal combustion engine is diagrammatically illustrated at 10, in Fig. 1, and has associated therewith an intake manifold 12 for delivery of the fuel mixture into the engine cylinders. According to the illustrated construction, a down-draft carbureter 14 is utilized for feeding the fuel mixture downwardly into the intake manifold but it will be apparent that certain features of the invention may be applicable to systems in which an up-draft is utilized. A fuel pump 16 is mounted on the engine casing and is mechanically driven from an engine cam shaft in a well-known manner. The fuel pump serves to suck fuel through a line 18 from a supply tank 20 and deliver the fuel through a pipe line 22 which leads to the carbureter 14. The details of the carbureter are more fully described in my co-pending application Ser. No. 409,538, filed November 25, 1929, which has become Patent No. 1,996,590, dated April 2, 1935, but, by referring to Fig. 4, it will be understood that a vertical tube 24 is provided having at its upper end a choke valve 26 and at its lower end a throttle valve 28. A venturi 30 is provided at the mid-portion into which the fuel is directly delivered from the pipe line 22 through the central delivery orifice 32. A valve 34 closes the fuel conduit when the carbureter is inactive. Suction produced in the intake manifold during the starting of the engine will be communicated to a diaphragm 36 which will effectuate an opening of the valve 34 against the resistance of a spring 38. The valve 34 is further intended to be controlled by a lever 40 actuated by movement of the throttle when in idle position and the fuel is then supplied through an auxiliary inlet, which is not shown in the present disclosure, and when the throttle is open wide for starting purposes, the valve 34 is opened by movement of the lever 40 in order to permit delivery of the fuel into the mixture chamber of the carbureter.

The construction of the fuel pump may be of any desirable form in which a substantially constant resilient pressure is maintained on the fuel delivered by the pump, and Fig. 2 illustrates a preferred construction in which a flexible pumping diaphragm 42 is positively moved in a suction direction by movement of a lever 44 actuated from the engine cam shaft and is resiliently urged in a discharge direction to take a variable stroke by the action of a spring 46, enclosed in a chamber 48 on the back side of the pump diaphragm. The pumping chamber 50 is in communication with a fuel-receiving and trapping chamber 52 through a spring-pressed inlet valve 54. The supply line 18 from the supply tank leads into the fuel-receiving chamber 52 through a centrally disposed intake 56. The delivery from the variable capacity pumping chamber 50 is through a spring-pressed discharge valve 58 into a chamber 60 from which the fuel is delivered through the pipe line 22. An air dome and vapor trap 62 is provided to maintain a uniform delivery from the pump. A pressure tube 64 communicates with the intake manifold and the chamber 48, on the back side of the pump diaphragm, as shown in Fig. 3, and serves to produce pressure variations in the chamber 48 corresponding to the changes in pressure in the intake manifold. A plug 66 is threaded into the pump casing and has a restricted orifice 68 for bleeding air into the chamber 48 and the tube 64 is generally provided with an additional air bleed adjacent to its connection to the intake manifold, as hereinafter referred to.

The apparatus for draining the fuel from the intake manifold is shown in detail in Fig. 3 in which the intake manifold is formed with a depressed trap chamber 70 which serves to collect the excess liquid fuel and a threaded plug 72 is secured to the intake manifold to form the bottom of the trap chamber. A secondary trap chamber 74 is provided for receiving the fuel from the manifold trap chamber 70 and, in the disclosed construction, is attached to a T-shaped head 76 inserted in the pipe line 18 which leads to the intake for the pump. A valve seat member 80 is pressed into the upward extension of the T-shaped connection 76 and cooperates with a valve 82 controlled by movement of a float 84 having a stem 86. The valve seat member 80 further serves as a seat for an upwardly pressed check valve 88 maintained normally in closed position by a spring 90 which is positioned by a stem 92 carried by a removable threaded head 94. The top of the chamber 74 is flanged, as at 96, and has seated thereon a perforated strainer plate 98 and an additional cover 100 having a flange 102. The perforated strainer 98 serves to filter the air which is drawn into the intake manifold countercurrent to fuel delivered into the fuel-collecting chamber 74 and tends to keep dirt out of the liquid fuel which collects in the chamber 74. The outside cover 100 and the strainer plate 98 are secured to the chamber 74 by means of bolt and nut connections 104. The cover 100 has openings 106 which permit atmospheric pressure to continuously act upon the fuel in the chamber 74 and permit air to be drawn into the manifold counter-current to the fuel delivered into the chamber 74. A T-shaped union 108 is threaded at its upper end into the plug 72 and extends downwardly into the trap chamber 74 through a flanged opening 110 of the outer cover 100 and an opening in the strainer plate 98. The lower end of the connection 108 has a perforated cap 112 secured thereto which forms a guide for the upper end of the float stem 86.

Thus the fuel from the manifold trap chamber 70 is delivered through openings 114 into a vertical passage 116 formed in the union 108 and then passes through a restricted opening 118 therein from which the fuel is delivered through openings 120 formed in the cap 112 into a chamber 122 within the trap 74. As the level of the fuel collected in the chamber 122 rises, the float valve 82 will be lifted from its seat and permit the fuel to pass in communication with the check valve 88 whereupon the suction produced in the pipe line 18 will serve to open the check valve 88 to cause the fuel collected in the chamber 122 to pass to the intake side of the pump together with the fuel from the supply tank. The fuel will be sucked out from the trap chamber until the float valve again closes, and, it will be apparent that the provision of the float valve prevents air from being drawn into the pipe line 18 which would prevent priming of the pump. Further, the provision of the check valve 88 prevents fuel from being delivered into the trap chamber from the supply line 18 should the vehicle be in such position that the supply tank produces a head of fuel in the passage which leads into the trap chamber from the pipe line 18.

The restricted opening 118 formed in the duct which delivers fuel from the manifold trap to the chamber 122 prevents excessive air from being drawn into the intake manifold under vacuum conditions which might disturb the mixture of fuel and air produced by the carbureter. Another function of the restricted opening 118 consists in the fact that the opening 118 serves as an air bleed for the pressure tube which is also connected to the T-shaped union 108 by a threaded connection 124.

Referring to the assembly in Figs. 5 and 6, there is shown an engine driven fuel pump 125. Above a discharge valve 126 therein there is mounted a vapor dome 127. A tube 128, acting as the pump discharge, leads to a vapor trap 129 which is mounted on the side of the carbureter body by means of a threaded pipe extension 130, screwed into the boss. The tube 128 is fastened to the vapor trap 129 in any suitable way, the upper end of which terminates in an internal stand-pipe 131. A domed cap 132 is screwed into the trap 129, thus providing a trap chamber 133. A depending pipe 134 is fixed in the highest point of the cap 132 and extends downwardly in the chamber 133 to a point above the opening of the stand-pipe 131. The inner pipe 134 connects through the top of the cap 132 to a tube 135, which leads to an opening 136 in a head member 137, forming the upper closure of a float trap chamber 138. See Figs. 5 and 6. An annular gasket 139 is clamped in sealing relation between the lower face of the head 137 and a bowl 140. The bowl 140 supports and holds in position a strainer 141 and a perforated dished member 142. A T 143 is fastened to the bottom of the bowl 140 and communicates through a tube 144 with the pump and through a second tube 145 with the main source of fuel supply. A plug 146 is screwed into the bottom of the T 143 to permit access thereto, and a compression spring 147, guided by an extension 148 on the plug 146, urges a valve disk 149 against a seat member 150 in the T 143. A needle 151, seating in the member 150, carries a float 152, and is guided at its top by a hole in the dished member 142. Formed on the top of the float-head 137 in a short pipe 153 terminating in a flange 154, against which there is an annular gasket 155 clamped between the flange 154 and an upper flange 156 on a tubular member 157, which is screwed into a hole in the bottom of an inlet manifold 158 directly below a fuel mixer 159 leading to the manifold 158. The bore of the short pipe 153 extends down into the head 138 forming a sump 160, in which there is a nozzle member 161 set in the head 137, projecting upwardly into the sump 160. The member 161 is formed with an annular groove 162 open at the top and communicating at the bottom with the sump 160 through holes 163. A horizontal passage 164 leads from an adjustable air bleeder 165 to a bore 166 in the middle of the nozzle member 161. The bottom of the bore 166 is made with a valve seat 167. A cage 168 in the head 137 supports a valve disk 169 adapted to cooperate with the seat 167 to form a downwardly opening check valve. A tube 170 leads from the inlet manifold 158 to the load-control chamber of the pump.

In Fig. 7, I have shown a modified form of the spill-over having a float trap head 171 provided with a bowl 172, a bottom T 173, a bottom plug 174 and pump and fuel source connecting tubes 175 and 176, respectively, also a check valve spring 177, a spring guide extension 178 on the plug 174 and a valve 179. A needle valve rod 180 carries a float 181, and is guided by a hole in a perforated dished member 182. A nozzle member 183 is provided with an annular groove 184 which communicates through radial holes 185 with a sump 186. There is also a strainer 189 and a gasket 188. An air bleeder valve 189 opens directly into a cavity 190 in the top of the bowl 172. A tube 191, communicating with the cavity 190 through a fitting 192 is adapted to be connected to the load control chamber of a pump. The head 171 carries a riser 193 of substantial length, terminating in an upper flange 194. A gasket 195, preferably of heat-insulating material, is clamped between 194 and a mating flange 196 of a tubular riser member 197. The tubular member 197 is screwed into or otherwise fastened to the inlet manifold 198 of an internal combustion engine directly below the carbureter, as shown in Fig. 5.

In the construction shown in Fig. 8, the riser extension of the float trap head, which will hereafter be referred to as the lower riser member, may be provided with radiating fins 199. In this figure the gasket 195 is clamped between flanges 194 and 196 by means of screws which are provided with sleeves 200 and washers 201 of heat insulating material.

As shown in Fig. 9, the lower riser member is without radiating fins, while fins 202 are provided on the tubular upper riser member.

Referring to Fig. 10, there may be provided a heat-insulating jacket 203 fastened around the lower riser member by means of a strap clamp 204.

As will be seen from the above, in the construction shown in Figs. 5 and 6, the excess condensed fuel from the manifold 158 accumulates in the bowl 138 together with any condensed vapors received from the carbureter supply line through the pipe 135 and is thence conveyed, when the check valve 149 is opened, by the pipe 144 to the pump 125, controlled air being admitted to the trap 160 from the manifold by the regulatable air vent 165. The check valve 169 prevents the withdrawal of vapor upwardly from the bowl 138 into the manifold. As in the case of the construction shown in Fig. 3, here the float controlled valve 151 and the check valve 149 operate in a manner similar to the valve 82 and the check valve 88. In the construction of the modification shown in Fig. 7, the construction operates in a manner similar to the construction in Figs. 5 and 6, except that here, instead of the vapor trap pipe 135 leading into the bowl there is a pipe 191 leading into the fuel bowl 172, which also has a controllable air vent 189, so as to communicate with the load controlled side of the diaphragm pump in the same way as shown in Figs. 2 and 3. In this instance there is also no check valve in the upper part of the bowl 172, and which is also similar to this feature of the construction in Figs. 2 and 3. Figs. 8, 9 and 10 merely show amplified means for cooling the vapors in the fuel trap 186 by means of fins 199 or 201 and the heat insulating jacket 203 near the engine to prevent access of the heat to the fuel trap.

While I have described my invention above in detail I wish it to be understood that many changes may be made therein without departing from the spirit of the same.

I claim:

1. In a fuel feeding system for internal combustion engines, an intake manifold for supplying a fuel mixture to the engine, a carbureter for delivering a fuel mixture into said intake manifold, a supplemental float chamber, means for collecting excess liquid fuel in the intake manifold and delivering such fuel into the supplemental float chamber, an outlet from said float chamber, a float in said float chamber controlling the outlet from said chamber and a secondary suction-operated valve controlling the outlet from said float chamber.

2. In a fuel feeding system for internal combustion engines, an intake manifold for supplying the fuel mixture to the engine, a downdraft carbureter mounted on said intake manifold to deliver the fuel mixture downwardly into said manifold, a source of fuel supply, mechanical pumping means operated by the engine for pumping fuel from said source of supply to said carbureter, means for controlling the action of the mechanical pumping means by the pressure in the intake manifold, vented means for collecting excess liquid fuel from the intake manifold and means for delivering such collected liquid fuel to the intake of said pumping means and air from the vent to the controlling means.

3. In a fuel feeding system for internal combustion engines, an intake manifold for supplying the fuel mixture to the engine, a carbureter delivering the fuel mixture downwardly into the intake manifold, a collecting pocket for excess liquid fuel associated with the intake manifold, an atmospheric chamber in communication with said collecting pocket through a restricted passage for receiving the collected liquid fuel, mechanical pumping means operated by the engine for delivering fuel from a source of supply to the carbureter, an intake supply line to said mechanical pumping means, a passage forming an outlet from said atmospheric chamber in communication with the intake supply line and a spring-pressed suction-operated valve controlling said connecting passage.

4. In combination with the intake manifold of an internal combustion engine, a fuel collecting chamber continuously open to atmospheric pressure at the top and having a float-controlled valve draw-off at the bottom and a continuously open drain leading from said intake manifold into said chamber whereby unvaporized liquid fuel may drain into said chamber from said intake manifold counter-current to air drawn into said manifold through said drain.

5. In combination with the intake manifold of an internal combustion engine, a fuel collecting trap in said manifold for collecting unvaporized liquid fuel, a fuel collecting chamber outside of said manifold continuously open to atmospheric pressure at the top and having a float-controlled valve draw-off at the bottom, a continuously open drain leading from said trap into said chamber whereby unvaporized liquid fuel collected in said trap is delivered to said chamber counter-current to air drawn into said manifold through said drain and means for drawing off the fuel from the chamber and returning it to the engine.

6. In combination with the intake manifold of an internal combustion engine, a fuel collecting trap in said manifold, a fuel collecting chamber outside of said manifold, an air filter enclosing the top of said chamber, a cover secured to said chamber above said filter and having openings therein allowing atmospheric pressure to continuously act upon the fuel in said chamber and a drain tube leading from said trap through said cover and said filter into said chamber whereby unvaporized liquid fuel is delivered from said trap into said chamber counter-current to air drawn into said manifold through said drain tube.

7. In combination with an internal combustion engine, a carbureter, an intake manifold, a fuel pump for delivering fuel from a source of supply to said carbureter, said fuel pump having inlet and outlet check valves, a fuel collecting chamber below said intake manifold continuously open to atmospheric pressure, a drain leading from said intake manifold into said chamber whereby unvaporized liquid fuel may drain into said chamber, a connection from the bottom of said chamber to the inlet side of said pump and a spring-pressed check valve normally closing said connection and adapted to be opened by the suction of said pump to draw fuel from said collecting chamber into said pump for delivery back to said carbureter.

8. In combination with an internal combustion engine, a carbureter, an intake manifold, a pump for delivering fuel from a source of supply to said carbureter, a fuel collecting chamber positioned below said manifold and continuously open to atmospheric pressure, a drain leading from said manifold into said chamber for delivering unvaporized fuel from said manifold into said chamber, a second drain leading from the bottom of said chamber, a float-controlled valve in said chamber adapted to seat in one direction to close said second drain, a spring-pressed check valve adapted to seat in the opposite direction to close said second drain and a connection from beyond said spring-pressed check valve to the inlet side of said pump whereby the suction of said pump will open said spring-pressed check valve to draw fuel from said chamber when said float-controlled valve is open.

9. In combination with an internal combustion engine, an intake manifold, a downdraft carbureter for delivering the fuel mixture into said manifold, a fuel collecting pocket in said intake manifold beneath said carbureter, a continuously open drain leading downwardly from said fuel collecting pocket, a fuel collecting chamber continuously open to atmospheric pressure into which fuel is delivered from said drain, a fuel pump for delivery of fuel from a source of supply to said carbureter, an inlet feed line leading from said source of supply to said pump and connected to the bottom of said fuel collecting chamber, a float-controlled valve in said chamber normally closed to prevent delivery of fuel from said chamber into said feed line and a normally seated check valve for preventing the delivery of fuel into said chamber from said feed line whereby when the float-controlled valve is open suction of the pump will open said check valve to draw fuel from said chamber and deliver the fuel back to said carbureter.

10. In a fuel feed system for internal combustion engines, an intake manifold, a carbureter for delivering fuel mixture into said manifold, a throttle valve for controlling the delivery of the fuel mixture from said carbureter into said manifold, a continuously open drain tube leading from said manifold on the engine side of said throttle, a diaphragm fuel pump for delivering fuel from a source of supply to said carbureter, a connection from said drain tube to the rear side of the diaphragm of said pump adapted to control the delivery of fuel by said pump by the pressure in said intake manifold and means for collecting the fuel delivered through said drain tube and returning the fuel to the pump for redelivery to the carbureter.

11. In combination, an internal combustion engine having a manifold, means to supply the engine manifold with air and fuel, a chamber connected to the manifold adapted to collect excess liquid fuel therefrom, a continuously open air port communicating therewith between the chamber and the manifold.

12. In combination, an internal combustion engine having a manifold, means to supply the engine manifold with air and fuel, a chamber connected to the manifold and adapted to collect excess liquid fuel therefrom, and a check valve located between the chamber and the manifold communicating therewith between the chamber and the manifold and adapted to prevent the withdrawal of vapor from the chamber into the manifold.

EDWARD A. ROCKWELL.